United States Patent [19]

Kashihara et al.

[11] Patent Number: 5,123,496
[45] Date of Patent: Jun. 23, 1992

[54] REAR-WHEEL STEERING ANGLE DETECTING APPARATUS FOR A VEHICLE

[75] Inventors: Masanobu Kashihara; Hiromasa Ozawa; Masayoshi Onishi, all of Himeji, Japan

[73] Assignee: Mitsubishi Denki K.K., Tokyo, Japan

[21] Appl. No.: 613,765

[22] PCT Filed: Jun. 5, 1990

[86] PCT No.: PCT/JP90/00733
  § 371 Date: Nov. 12, 1990
  § 102(e) Date: Nov. 12, 1990

[87] PCT Pub. No.: WO90/15305
  PCT Pub. Date: Dec. 13, 1990

[30] Foreign Application Priority Data
  Jun. 6, 1989 [JP] Japan .................................. 1-144787

[51] Int. Cl.⁵ .................................. B62D 5/04
[52] U.S. Cl. .................................. 180/79.1; 180/140; 180/142; 280/91; 364/424.05
[58] Field of Search .................. 180/79.1, 140, 142; 280/91; 364/424.05

[56] References Cited

U.S. PATENT DOCUMENTS 4,679,808  7/1987  Ito et al. .................................. 280/91
5,020,619  6/1991  Kanazawa et al. .................. 180/79.1

Primary Examiner—Mitchell J. Hill
Attorney, Agent, or Firm—Sughrue, Mion, Zinn, Macpeak & Seas

[57] ABSTRACT

A rear-wheel steering angle detecting apparatus according to the present invention includes an absolute value type rotary encoder (13) operatively connected with a rear-wheel steering mechanism for detecting the steering angle of the rear wheels of a vehicle, and a controller for finely dividing the output of the rotary encoder by the output of a pulse generator (12) for fine division of the rear-wheel steering angle. By finely dividing the rear-wheel steering angle, as detected by the rotary encoder, by the number of pulses generated by the pulse generator, which is used for speed detection, the rear-wheel steering angle is detected with a high degree of resolution.

1 Claim, 2 Drawing Sheets

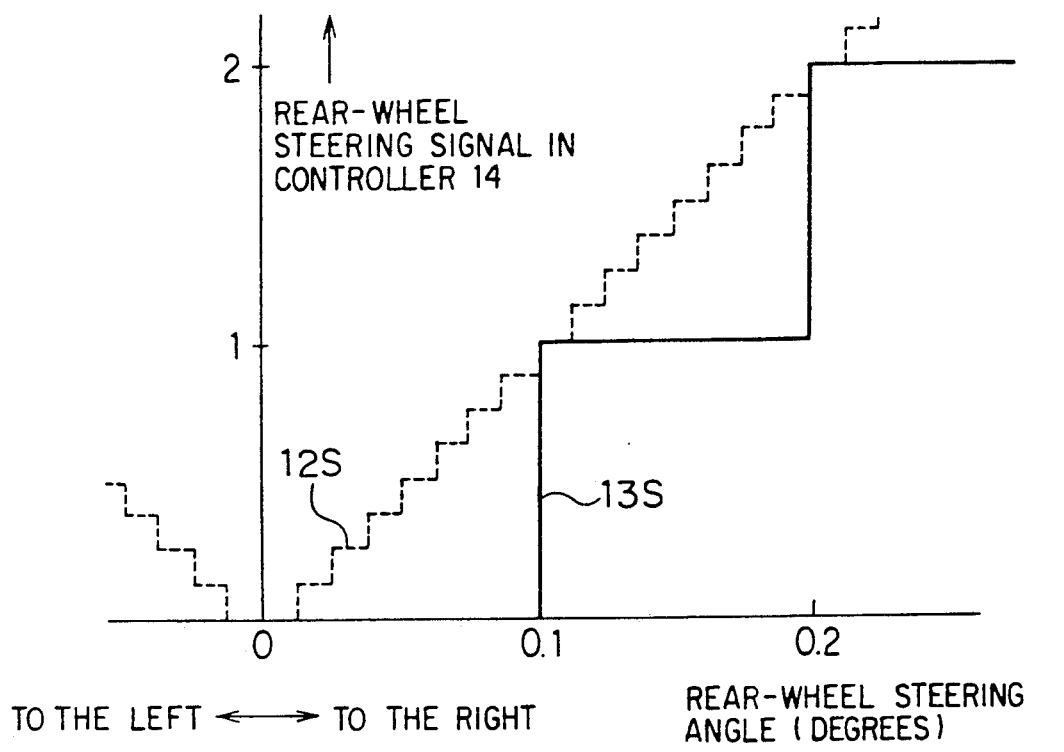

REAR-WHEEL STEERING ANGLE DETECTING APPARATUS FOR A VEHICLE

TECHNICAL FIELD

The present invention relates to a rear-wheel steering angle detecting apparatus for a vehicle capable of detecting the steering angle of the rear wheels of a vehicle with a high degree of resolution.

PRIOR ART

In a conventional rear-wheel steering angle detecting apparatus for a vehicle, a variable resistor is connected with a rear-wheel steering mechanism so that the output voltage of the variable resistor is input to an analog/-digital converter (hereinafter referred to as an AD converter) where it is converted into a digital value which is then transmitted to a microcomputer.

In the following, the operation of the above conventional apparatus will be described. In accordance with the operation of the rear-wheel steering mechanism, the resistance of the variable resistor changes, and the output voltage of the variable resistor, varying according to such changes, is input to the AD converter where it is converted into a digital value. The digital value thus converted is input to the microcomputer for detection of the rear-wheel steering angle.

With the coventional rear-wheel steering angle detecting apparatus as constructed above, it is necessary to detect the rear-wheel steering angle with a high degree of resolution and at the correct positions of the rear wheels. In order to perform the detection of the rear-wheel steering angle with a high resolution, however, an AD converter having a multi-bit output is required. This poses a problem that such an AD converter with a multi-bit output is expensive.

The present invention is intended to obviate the above-described problem, and has for its object the provision of a rear-wheel steering angle detecting apparatus for a vehicle which is aable to perform the detection of the rear-wheel steering angle with a high degree of resolution at low costs.

DISCLOSURE OF THE INVENTION

The rear-wheel steering angle detecting apparatus for a vehicle according to the present invention includes an absolute value type rotary encoder operatively connected with a rear-wheel steering mechanism for detecting the steering angle of the rear wheels of a vehicle, a pulse generator for detecting the speed of a rear-wheel steering drive mechanism, and a controller for finely dividing the output of the absolute type rotary encoder by the output of the pulse generator for fine division of the rear-wheel steering angle.

The controller of the invention detects the rear-wheel steering angle with a high degree of resolution by dividing the rear-wheel steering angle, as detected by the rotary encoder, by the number of pulses generated by the pulse generator.

BRIEF DESCRIPTION OF THE DRAWINGS

FIG. 2 is an explanatory view for showing the relateionship between the rear-wheel steering angle and the rear-wheel angular signal for describing the operation of the above embodiment.

THE BEST MODE FOR IMPLEMENTING THE INVENTION

Figure 1:
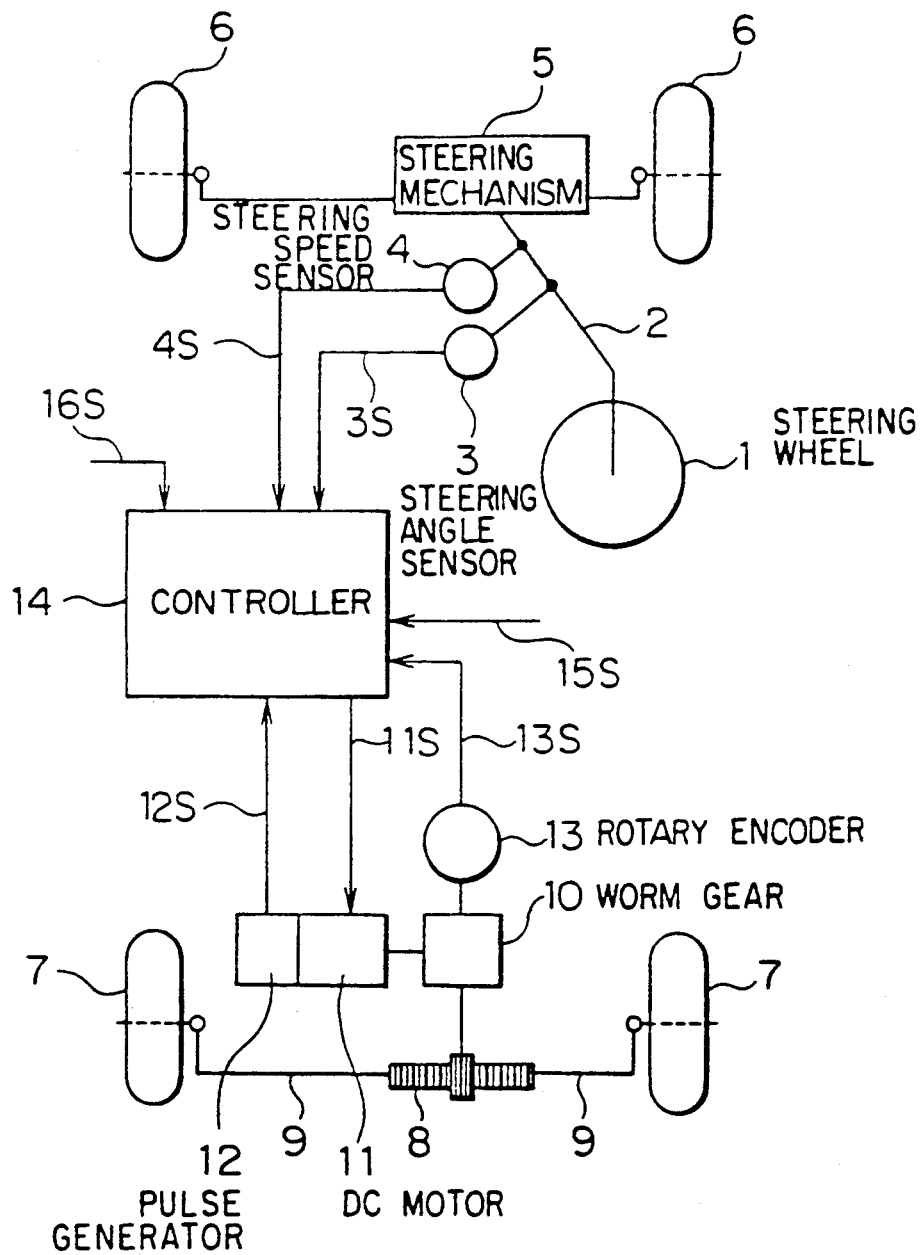
FIG. 1 is a block diagram showing the construction of a rear-wheel steering angle detecting apparatus for a vehicle in accordance with one embodiment of the present invention.

In the following, a preferred embodiment in accordance with a rear-wheel steering angle detecting apparatus of the present inveniton will be described in detail with reference to the drawings. FIG. 1 is a block diagram of the construction of the embodiment.

In FIG. 1, reference numeral 1 designates a steering wheel in accordance with the steering operation of which front wheels 6 of a vehicle are steered through the intermediary of a steering shaft 2 and a front-wheel steering mechanism 5.

Connected with the steering wheel 2 is a steering angle sensor 3. The steering angle sensor 3 generates a steering angle signal 3S for the front wheels 6 to a controller 14.

Similarly, connected with the steering wheel 2 is a steering speed sensor 4 which serves to generate a steering speed signal 4S for the front wheels 6 to the controller 14.

The controller 14 is input with vehicle speed signal 16S, the steeing angle signal 3S and the steering speed signal 4S, calculates and determines, based thereon, target steering positions of the rear wheels 7 in relation to the steering of the front wheels 6, and generates a DC motor drive signal 11S to a DC motor 11 so as to control it.

Operatively connected with the DC motor 11, which constitutes a rear-wheel steering drive mechanism, is a worm gear 10 which is in meshing engagement with a rear-wheel steering rack and pinion mechanism B.

The worm gear 10 and the rear-wheel steering rack and pinion mechanism B together constitute a rear-wheel steering mechanism.

The rear-wheel steering rack and pinion mechanism 8 is connected with the rear wheels 7 through tie rods 9.

Further, mounted to the DC motor 11 is a pulse generator 12 which generates pulses corresponding to the number of revolutions per minute of the DC motor 11. The pulse generator output signal 12S is input to the controller 14 so as to feed back thereto the number of revolutions per minute of the DC motor 11.

In addition, connected with the worm gear 10 is a digital or absolute type rotary encoder 13 which serves to detect the steering positions of the rear wheels 7 and generate an output signal 13S to the controller 14.

Reference 15S designates an engine rotation signal which is input to the controller 14.

The operation of the above embodiment will now be described. When the steering wheel 1 is turned for steering, the front wheels 6 are steered to accordingly turn through the intermediary of the steering wheel 2 and the front-wheel steering mechanism 5. At this time, the steering angle sensor 3 operatively connected with the steering wheel 2 detects the steering angle of the front wheels 6 and generates a steering signal 3S for the front wheels 6 to the controller 14.

Simultaneous with this, the steering speed sensor 4 detects the steering speed of the front wheels 6 and generates a steering speed signal 4S for the front wheels 6 to the controller 14.

The controller 14 receives the steering angle signal 3S, the steering speed signal 4S and the vehicle speed signal 16S, calculates and determines, based thereon, target steering positions for the rear wheels 7, and generates a DC motor drive signal 11S to the DC motor 11.

With this, the DC motor 11 is controllably driven to operate so that the rear wheels 7 are steered to the target steering positions through the action of the worm gear 10, the rear-wheel steering rack and pinion mechanism 8 and the tie rods 9.

In addition, the pulse generator 12 generates pulses in accordnace with the number of revolutions per minute of the DC motor 11, so that the number of revolutions per minute of the DC motor 11 is fed back to the controller 14 from the pulse generator 12, thus steering the rear wheels 7 in a speed-controlled manner.

Further, the rotary encoder 13 is operatively connected with the worm gear 10 so that it detects the positions of the rear wheels 7 through the operation of the worm gear 10 and generates an output signal 13S to the controller 14.

As a result, the controller 14 controllably drives the DC motor 11 in such a manner as to make the detected steering positions of the rear wheels 7 approach the target steering positions, thereby steering the rear wheels 7.

Next, the process for detecting the steering of the rear wheels 7 will be described while referring to FIG. 2. In FIG. 2, the abscissa represents the steering angle of the rear wheels 7 and the ordinate the rear-wheel steering signal inside the controller 14.

The rotary encoder 13 is a 5 bit device, and has a structure, mechanical strength and size suitable and sufficient for the mounting thereof on a vehicle, and is inexpensive to manufacture.

The output signal 13S of the rotary encoder 13, being in the form of a 5-bit signal, has a resolution capacity of dividing the total steering angle of the rear wheels 7 into 32 angle sections. In the illustrated example, the encoder 13 provides a resolution of 0.1 degrees.

On the other hand, the output signal 12S of the pulse generator 12 is used for controlling the rotational speed of the DC motor 11, as described above, and it is a signal representing the steering amount of the rear wheels 7 in a very fine manner.

Accordingly, by adding or subtracting the output signal of the pulse generator 12 to or from the point of change of the output signal 13S of the rotary encoder 13 in accordance with the rotational direction of the DC motor 11, the steering positions of the rear wheels 7 can be detected with absolute values in a very fine manner.

In this manner, the combination of the output signal 13S of the inexpensive absolute value rotary encoder 13 and the output signal 12S of the pulse generator 12 can be employed a a high-resolution position detector.

INDUSTRIAL APPLICABILITIES

As described in the foregoing, according to the present invention, the rear-wheel steering angle as detected by the absolute value rotary encoder is finely divided by a pules which is generated by the pulse generator which is used for detecting the rotational speed of the DC motor. This construction provides the advantage that it is possible to detect the positions of the rear wheels with a high degree of resolution at low costs.

We claim:

1. A rear-wheel steering angle detecting apparatus for a vehicle, comprising:
a rear-wheel steering mechanism (8–10), drive means (11) operatively coupled to said steering mechanism, an absolute value rotary encoder (13) operatively connected with said rear-wheel steering mechanism for detecting a steering angle of rear wheels of a vehicle, a pulse generator (12) operatively connected with said drive means for detecting a speed of said drive means, and a controller (14) for finely dividing the steering angle of said rear wheels detected by the absolute value rotary encoder by a number of pulses generated by the pulse generator to detect the steering angle of said rear wheels with an enhanced degree of resolution.

* * * * *